No. 770,438. PATENTED SEPT. 20, 1904.
M. McDERMOTT.
COMBINED MATCH BOX, CIGAR CUTTER, AND LIGHTER.
APPLICATION FILED MAY 16, 1904.
NO MODEL.
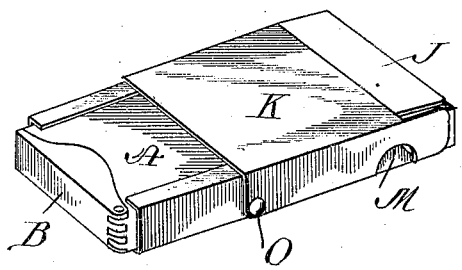
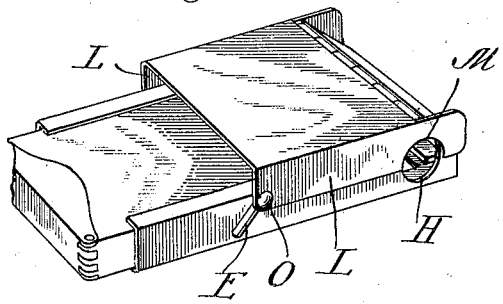
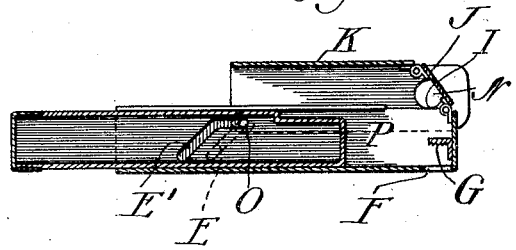
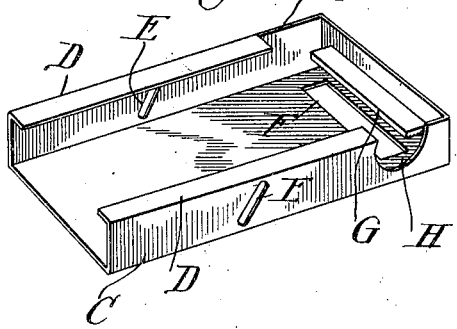
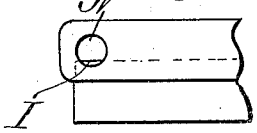

No. 770,438. Patented September 20, 1904.

UNITED STATES PATENT OFFICE.

MARGARET McDERMOTT, OF CHICAGO, ILLINOIS.

COMBINED MATCH-BOX, CIGAR CUTTER, AND LIGHTER.

SPECIFICATION forming part of Letters Patent No. 770,438, dated September 20, 1904.

Application filed May 16, 1904. Serial No. 208,276. (No model.)

*To all whom it may concern:*

Be it known that I, MARGARET McDERMOTT, a citizen of the United States, and a resident of Chicago, in the county of Cook and State of Illinois, have invented certain new and useful Improvements in a Combined Match-Box, Cigar Cutter, and Lighter, of which the following, taken in connection with the accompanying drawings, is a specification.

My invention has for its object the production of a combined match-box and cigar cutter and lighter, and is so constructed that it is of practically the same size as the ordinary match-safe and adapted to be carried in the pocket. By means of the compartment arranged for lighting the match and cigar it is possible to light a cigar in the wind without danger of the light being immediately extinguished.

My invention consists in the novel combination and arrangement of the several parts, as will be hereinafter more fully set forth, and pointed out in the claims.

In the drawings, Figure 1 is a perspective view of my invention with the lighting-compartment closed down. Fig. 2 is a perspective view with the lighting-compartment raised and ready for use. Fig. 3 is a longitudinal cross-section. Fig. 4 is a perspective view of the outer casing with the match-safe and lighting-compartment removed. Fig. 5 is a detail of one side of the casing, showing the aperture through which the end of the cigar is passed and the knife for cutting the same.

Like reference-letters indicate like or corresponding parts in the several figures.

In carrying out my invention, A represents the match safe or box, which may be of any suitable size, and B is the cover of the usual kind.

C is an outer casing having two inwardly-turned flanges D upon the upper side thereof extending a portion of its length, as shown. Upon each side of this casing C is a slot E, the purpose of which will be hereinafter more fully described. In one side of the match-box is a slot E', corresponding with the slot E in the outer casing on the same side thereof and prolonged a short distance longitudinally of said box. A horizontal slot F extends across the bottom of this casing, through which a match is inserted to be ignited against a roughened surface G. A semicircular opening H is provided in this outer casing, which registers with a similar opening in the top section to form an aperture for the reception of the end of the cigar to be lighted. Upon the other side of this outer casing and opposite the opening H is provided a knife-edge I to be used in cutting off the end of the cigar. Hinged or otherwise secured to the end of this outer casing is a movable section J, to which is likewise secured another movable section, K. This latter section is provided with side pieces L, which fit down over the sides of the outer casing C. One of the side pieces L is provided with a semicircular opening M, which registers with the corresponding opening H in the outer casing when in use. The other side piece has an aperture N, through which the end of the cigar to be cut off may be inserted. Each of these side pieces is provided at the lower corners with pins or projections O, extending inwardly far enough to engage with the slots E and move therein when the sections J and K are raised or lowered. The pin or projection O upon the side having the corresponding slot E' is of sufficient length to extend through the outer casing and travel in the slot E'. This arrangement serves when the device is not in use to light the cigar to lock the box inside the casing and hold it as shown in Fig. 1. When the section K is raised, it permits the box to slide out of the casing the length of the longitudinal slot, thereby locking the section K in raised position and providing the air space or chamber P.

The operation of the device is as follows: The section K is raised the length of the slots E, the end of the cigar inserted through aperture N, and the section K pushed back to normal position, this movement cutting off the end of the cigar. The section K, and with it of course the section J, is again raised to position shown in Figs. 2 and 3 and a match is inserted through slot F and lighted and applied to the end of a cigar inserted through the aperture H M. The sections J and K are then folded back into place and the device assumes the shape and size of an ordinary match-safe.

By the above description it will be seen that I have provided a combined match-safe and cigar-lighter which is entirely efficient and practical for the purpose for which it is intended.

I do not desire to be limited to the precise details of construction which I have specifically described, as the details thereof may be changed without departing from the spirit of my invention, which consists, essentially, in providing a match-box having folding sections which may be raised to form an air-chamber of sufficient size when in its raised position that a match may be lighted within the same and at the same time enough of a circulation of air be provided to prevent the light from being smothered out.

What I claim as new, and desire to secure by Letters Patent, is—

1. In a device of the class described, the combination of a match-box provided with a slot in one side thereof, an outer casing having a slot on each side thereof, one of said slots registering with the slot in the match-box, movable sections secured to said outer casing, projections on one of said movable sections, said projections traveling in the aforesaid slots, and regulating the movement of the box in said outer casing, substantially as described.

2. In a device of the class described, the combination of a match-box provided with a slot in one side thereof, an outer casing having a slot in each side thereof, one of said slots registering with the slot in the match-box, movable sections secured to said outer casing, the outer casing of said box provided with a knife-edge which coöperates with said movable sections, projections on one of said movable sections, said projections traveling in the aforesaid slots, and regulating the movement of the box in said outer casing, substantially as described.

MARGARET McDERMOTT.

Witnesses:
FLORENCE KING,
CHARLES I. COBB.